United States Patent [19]

Lynch et al.

[11] 4,183,907
[45] Jan. 15, 1980

[54] METHOD FOR PREPARING CALCIUM HYPOCHLORITE

[75] Inventors: Richard W. Lynch, Chattanooga; Ronald L. Dotson, Cleveland, both of Tenn.

[73] Assignee: Olin Corporation, New Haven, Conn.

[21] Appl. No.: 937,224

[22] Filed: Aug. 28, 1978

[51] Int. Cl.$^2$ .............................................. C01B 11/06
[52] U.S. Cl. .................................................... 423/474
[58] Field of Search ...................... 252/187 R, 187 H; 423/473, 474; 260/453 R

[56] References Cited

U.S. PATENT DOCUMENTS

| | | | |
|---|---|---|---|
| 1,481,039 | 1/1924 | Taylor | 423/474 |
| 1,632,483 | 6/1927 | MacMullin | 423/473 |
| 1,632,485 | 6/1927 | MacMullin | 423/474 |
| 1,718,285 | 6/1929 | George | 423/474 |
| 2,694,722 | 11/1954 | Katz | 260/453 R X |
| 3,895,099 | 7/1975 | Sakowski | 423/473 |

OTHER PUBLICATIONS

Chattaway et al., "Alkyl Hypochlorites", *Journal Chemical Society*, vol. 123 (1923), pp. 2999-3003.
Fort et al., "Alkyl Hypochlorites", as abstracted in *Chemical Abstracts*, vol. 49 (1955), #12,271a.
Kirk-Othmer, *Encyclopedia of Chemical Technology*, 2nd Ed., vol. 5 (1964), Interscience, N.Y., pp. 24, 25.

*Primary Examiner*—Earl C. Thomas
*Attorney, Agent, or Firm*—Gordon F. Sieckmann; Donald F. Clements

[57] ABSTRACT

Calcium hypochlorite useful as a commercial sanitizing agent and swimming pool disinfectant is produced by a process wherein calcium hydroxide and organic hypochlorite are reacted in a first reaction zone to produce calcium hypochlorite. The portion of the calcium hydroxide remaining unreacted is recovered along with product calcium hypochlorite in a mixture of solids.

In a second reaction zone, an aqueous solution of sodium hydroxide is reacted with an organic hypochlorite to form an aqueous phase containing sodium hypochlorite and an organic phase. The aqueous phase is separated from the organic phase.

Chlorine is reacted with the mixture of solids of the first reaction zone and the aqueous phase of the second reaction zone in a third reaction zone to produce an aqueous slurry of calcium hypochlorite particles. The calcium hypochlorite particles are thereafter recovered and dried in granular form.

29 Claims, No Drawings

METHOD FOR PREPARING CALCIUM HYPOCHLORITE

This invention is a process for preparing calcium hypochlorite from organic hypochlorite.

Calcium hypochlorite is a commercial sanitizing agent used particularly in the disinfecting of swimming pool waters.

The term "high assay calcium hypochlorite" is used throughout the description and claims to define a finished product calcium hypochlorite containing at least about 73% calcium hypochlorite by weight on a dry basis, the balance being sodium chloride, water, and other inert materials.

In general, calcium hypochlorite is prepared from chlorine, sodium hydroxide, and calcium hydroxide.

In *Encyclopedia of Chemical Technology*, by Kirk-Othmer, 2nd edition, volume 5, pages 16-25, a variety of chemical processes are employed for preparing calcium hypochlorite. Reference is also made to solutions of organic hypochlorites prepared with carbon tetrachloride, chloroform, or o-dichlorobenzene.

The prior art teaches chemical methods of preparing calcium hypohalite from alkyl hypohalites. For example, U.S. Pat. Nos. 1,632,483 and 1,632,485, issued to Robert Burns MacMullin on June 14, 1927, disclose processes for producing high purity metal hypochlorites by reacting calcium hydroxide with alkyl hypochlorite in an alcohol or water solution to produce calcium hypochlorite.

U.S. Pat. No. 2,360,492, issued to Clifford A. Hampel on Oct. 17, 1944, discloses a process for the reaction of alkyl hypochlorite vapor and granular lime to produce calcium hypochlorite. This patent teaches that although the reaction will proceed where only traces of water are present, the presence of water up to 10% by weight of lime is highly desirable.

Some objections to the aforementioned and other processes for preparing calcium hypochlorite are:

(1) the large amount of capital necessary for process equipment and (2) the production of large amounts of sodium chloride in processing and as undesired contaminants in product calcium hypochlorite.

There is need, however, for a process for producing calcium hypochlorite having a high available chlorine content with low sodium chloride and calcium chloride contents, which overcomes the aforementioned and other objections.

OBJECTS

It is a primary object of the present invention to provide a non-aqueous process for enriching raw material calcium hydroxide with calcium hypochlorite without producing calcium chloride by-product.

Another object of the present invention is to provide a process for producing calcium hypochlorite wherein the concentrations of sodium chloride and calcium chloride are minimal.

Another object of the present invention is to provide a process for producing high assay calcium hypochlorite.

These and other objects of the invention will become apparent from the following description and the appended claims.

BRIEF DESCRIPTION OF THE INVENTION

The foregoing objects are accomplished in the process of this invention, which comprises reacting in a first reaction zone, calcium hydroxide and an organic hypochlorite to form calcium hypochlorite and unreacted calcium hydroxide. The mixture of calcium hypochlorite and unreacted calcium hydroxide are separated from the first reaction zone as a mixture of solids.

In a second reaction zone, an aqueous solution of sodium hydroxide is reacted with an organic hypochlorite to form an aqueous phase containing sodium hypochlorite and an organic phase. The aqueous phase is physically separated from the organic phase.

In a third reaction zone, chlorine is reacted with the mixture of solids from the first reaction zone and the aqueous phase from the second reaction zone to produce an aqueous slurry of calcium hypochlorite particles.

The calcium hypochlorite particles are recovered from the slurry and dried in granular form.

DETAILED DESCRIPTION OF THE INVENTION

In the first reaction zone, calcium hydroxide is reacted with an organic hypochlorite to produce calcium hypochlorite and organic alcohol. A portion of the calcium hydroxide remains unreacted.

Although a variety of calcium hydroxide compositions are suitable for the process of this invention, a composition comprising calcium hydroxide in the range from about 94% to about 99% by weight, free water content of less than about 1% by weight, $CaCO_3$ less than about 2% by weight, and $CaSO_4$ less than about 1% by weight, is preferably employed.

It is preferred to employ anhydrous calcium hydroxide containing only a minimal amount of free water, i.e., less than about 1% by weight of the total mixture.

Examples of organic hypochlorite which may be employed in this process are secondary hypochlorites of the form,

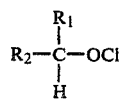

where $R_1$ and $R_2$ are each selected from a group consisting of alkyl and aryl groups having 1 to about 10 carbon atoms each. Examples of this type are isopropyl hypochlorite, isobutyl hypochlorite, pentane-2-hypochlorite, pentane-3-hypochlorite, 2-methylbutane-3-hypochlorite, hexane-2-hypochlorite, hexane-3-hypochlorite, 2-methylpentane-3-hypochlorite, 3-methylpentane-2-hypochlorite, 2-methylpentane-4-hypochlorite, 2,2-dimethylbutane-3-hypochlorite, heptane-2-hypochlorite, heptane-3-hypochlorite, heptane-4-hypochlorite, 2-methylhexane-3-hypochlorite, 2-methylhexane-4-hypochlorite, 2-methylhexane-5-hypochlorite, 2,2-dimethylpentane-3-hypochlorite, 2,2-dimethylpentane-4-hypochlorite, 3,3-dimethylpentane-2-hypochlorite, 2,4-dimethylpentane-3-hypochlorite, 2,3-dimethylpentane-4-hypochlorite, 3-ethylpentane-2-hypochlorite, octane-2-hypochlorite, nonane-2-hypochlorite, and decane-2-hypochlorite.

Other organic hypochlorites employed may be tertiary hypochlorites of the form,

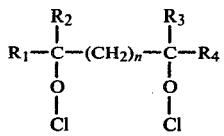

where n is an integer from 1 to about 10 and $R_1$, $R_2$, $R_3$, and $R_4$ are each selected from a group consisting of alkyl and aryl groups having 1 to about 10 carbon atoms each. Examples of tertiary diol hypochlorites of this type are 2,5-dimethylhexane-2,5-dihypochlorite, 2,4-dimethylpentane-2,4-dihypochlorite, 2,4-dimethylhexane-2,4-dihypochlorite, and 2-methyl-4-ethylhexane-2,4-dihypochlorite.

Still other examples of organic hypochlorites which may be used in this process are tertiary hypochlorites of the form,

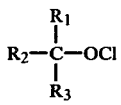

where $R_1$, $R_2$, and $R_3$ are each selected from a group consisting of alkyl and aryl groups having 1 to about 10 carbon atoms each.

Tertiary hypochlorites of this type are tertiary butyl hypochlorite, tertiary amyl hypochlorite, 3-methylpentane-3-hypochlorite, 2-methylpentane-2-hypochlorite, 3-isopropylpentane-3-hypochlorite, 2,3-dimethylpentane-3-hypochlorite, and 2,3-dimethylpentane-2-hypochlorite, 5-butylnonane-5-hypochlorite, 3,7-dimethyloctane-3-hypochlorite, 2-methyloctane-2-hypochlorite, 4-ethylheptane-4-hypochlorite, 2-methylheptane-2-hypochlorite, 3-methylheptane-3-hypochlorite, 4-methylheptane-4-hypochlorite, 4-propylheptane-4-hypochlorite, 3-ethylhexane-3-hypochlorite, 3-ethyl-5-methylhexane-3-hypochlorite, 2-methylhexane-2-hypochlorite, 3-methylhexane-3-hypochlorite, 2,3,5-trimethylhexane-2-hypochlorite, 2,3,4-trimethylhexane-2-hypochlorite, 2,2,3-trimethylhexane-3-hypochlorite, 2,3,5-trimethylhexane-3-hypochlorite, 3,4,4-trimethylhexane-3-hypochlorite, 3,5,5-trimethylhexane-3-hypochlorite, 2,4-dimethylpentane-2-hypochlorite, 3-ethyl-2-methylpentane-3-hypochlorite, 2-phenylpentane-2-hypochlorite, 3-phenylpentane-3-hypochlorite, 2,4,4-trimethylpentane-2-hypochlorite, 2,3-dimethylbutane-2-hypochlorite, 2,3,3-trimethylbutane-2-hypochlorite, triphenylmethane-hypochlorite.

Another organic hypochlorite which may be employed in the process of this invention is cyclohexane hypochlorite.

As used throughout the description and claims, the term "alkyl" is intended to include straight chain, cyclic, substituted straight chain and substituted-cyclic alkyl groups. As used throughout the description and claims, the term "aryl" is intended to include normal and substituted aromatic groups.

Methods of preparing organic hypochlorites suitable for use in the process of this invention are described in U.S. Pat. No. 1,938,175, issued to Richard M. Deanesly on Dec. 15, 1933, U.S. Pat. No. 2,694,722, issued to Irving Katz on Nov. 16, 1954, and U.S. Pat. No. 3,449,225, issued to Edwin A. Matzner on June 10, 1969. The teachings of these patents are incorporated herein in their entirety by reference.

Organic hypochlorites prepared electrolytically will generally be contained in a solution of the precursor organic alcohol.

The term "precursor organic alcohol" is used throughout the description and claims to define the organic alcohol used to prepare the organic hypochlorite.

One skilled in the art will recognize that the corresponding organic hypobromite may be employed in the process of this invention as well as organic hypochlorite.

However, the analogous organic hypohalite compounds containing iodine and fluorine tend to be more unstable than the corresponding compounds containing bromine or chlorine. It has generally been found advantageous to employ organic hypochlorite, organic hypobromite, or mixtures thereof in the process of this invention.

To simplify the description, the invention will be defined in terms of organic hypochlorite, but one skilled in the art will recognize that the term also includes organic hypobromites and mixtures of organic hypobromite with organic hypochlorite.

When an organic hypochlorite such as previously described is employed in the process of this invention, it may be contained in a solution of organic solvent, organic alcohol, or organic alcohol and organic solvent. However, for the practice of this invention the organic hypochlorite is contained in an organic solvent and organic alcohol precursor solution, in a concentration in the range of about 1% to about 95%, preferably in the range of about 3% to about 75% by weight.

The organic solvent is preferably nontoxic, essentially inert, and essentially immiscible with water, but essentially miscible with the organic alcohol employed in the process of this invention.

Suitable solvents include a wide variety of halogenated hydrocarbons and organic phosphate compounds. A typical family of halogenated hydrocarbon solvents are those represented by the form,

where $x+y=4$ and y is an integer from 2 to 4.

Examples of suitable members of this family of solvents include $CCl_4$, $CHCl_3$, and $CH_2Cl_2$.

Another example of an organic solvent is an organic phosphate of the form,

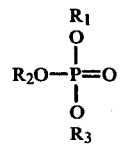

where $R_1$, $R_2$, and $R_3$ are each selected from a group consisting of an alkyl and aryl group, for example, methyl, ethyl, n-butyl, isopropyl, n-pentyl, isobutyl, n-propyl, phenyl, 2-tolyl, 3-tolyl, or 4-tolyl. In general, each separate alkyl or aryl group will have 1 to about 10 carbon atoms. Organic phosphates of this type are trimethyl phosphate, tri-ethyl phosphate, tri-n-butyl phosphate, tri-n-propyl phosphate, tri-isopropyl phosphate, tri-n-pentyl phosphate, tri-isobutyl phosphate, tri-phenyl phosphate, tri-2-tolyl phosphate, tri-3-tolyl phosphate, and tri-4-tolyl phosphate.

suitable pressure and temperature conditions to evaporate the organic materials. The resulting purified cake is reacted in the third reaction zone as described more fully below.

The evaporated organic materials are condensed and conveyed to the depleted organic storage for use as described more fully below.

In the second reaction zone of the process of this invention, an organic hypochlorite is reacted with an aqueous solution of sodium hydroxide to produce sodium hypochlorite and an organic alcohol as shown by the equation (2):

$$NaOH + ROCl \rightarrow NaOCl + ROH \qquad (2)$$

where ROCl and ROH are as defined previously.

The type and concentration of organic hypochlorite employed as a reactant in the second reaction zone is preferably the same as that previously described as a reactant in the first reaction zone.

The aqueous sodium hydroxide concentration is in the range from about 4% to about 50%, preferably in the range from about 8% to about 40% by weight. When concentrations of sodium hydroxide in the range from about 40% to about 50% by weight are employed, then the addition of substantial amounts of water may be necessary during the reaction in the second reaction zone to maintain suitable solution viscosity in a subsequent step of this process.

The molar ratio of sodium hydroxide to organic hypochlorite is in the range from about 3:1 to about 1:1, preferably in the range from about 1.5:1 to about 1.02:1 to insure an excess of sodium hydroxide reactant over organic hypochlorite reactant in the second reaction zone. The conversion of the sodium hydroxide is generally less than about 100%.

The temperature and pressure conditions of the second reaction zone are the same as those for the first reaction zone for considerations previously discussed.

When sodium hydroxide is reacted with the organic hypochlorite in the second reaction zone under the conditions described above, sodium hypochlorite and organic alcohol are formed in a solution which physically separates into an aqueous phase and an organic phase.

The aqueous phase is comprised of sodium hypochlorite in the range from about 10% to about 35% by weight, sodium chloride in the range of about less than 1% by weight, and the remainder being sodium hydroxide, water, and a small amount of organic alcohol and organic solvent.

The organic phase is comprised of organic hypochlorite, organic solvent, and organic alcohol, and is transferred to the depleted organic hypochlorite storage for use as described more fully below.

The time required for chemical reaction of the second reaction zone is in the range from about 1 to about 30 minutes, preferably in the range from about 5 to about 20 minutes.

The time required for the phase separation of the second reaction zone is in the range from about 1 to about 20 minutes, preferably from about 3 to about 15 minutes.

The aqueous phase is separated from the organic phase in the second reaction zone and conveyed to the third reaction zone. In the third reaction zone, chlorine is reacted with a mixture of solid calcium hypochlorite and unreacted calcium hydroxide from the first reaction zone and the aqueous phase from the second reaction zone.

In the third reaction zone, calcium hydroxide reacts with chlorine to form calcium hypochlorite, calcium chloride, and water as shown by the equation (3):

$$2Ca(OH)_2 + 2Cl_2 \rightarrow Ca(OCl)_2 + CaCl_2 + 2H_2O. \qquad (3)$$

Residual sodium hydroxide from the aqueous phase of second reaction zone reacts with chlorine to form sodium hypochlorite, sodium chloride, and water as shown by the equation (4):

$$2NaOH + Cl_2 \rightarrow NaOCl + NaCl + H_2O. \qquad (4)$$

Calcium chloride formed per equation (3) reacts with sodium hypochlorite formed per equation (4) and with sodium hypochlorite previously existing and contained in the aqueous phase from the second reaction zone, forming additional calcium hypochlorite and sodium chloride as shown by the equation (5):

$$CaCl_2 + 2NaOCl \rightarrow Ca(OCl)_2 + 2NaCl. \qquad (5)$$

In order to minimize the concentration of calcium chloride in the final product of the third reaction zone, it is necessary to closely control the ratio of calcium hydroxide to total sodium hypochlorite in the third reaction zone. The molar ratio of calcium hydroxide to sodium hypochlorite in the third reaction zone is in the range from about 0.7:1 to about 1.2:1, preferably in the range from about 0.8:1 to about 1.1:1. For example, when the proportion of residual calcium hydroxide in the filter cake is stoichiometrically equal to or just slightly less than the sodium hypochlorite in the aqueous phase, essentially all of the calcium hydroxide forms calcium hypochlorite after chlorination.

When the proportion of residual calcium hydroxide in the filter cake is greater than the sodium hypochlorite in the aqueous phase, undesirable calcium chloride by-product will be present after chlorination.

The temperature and pressure conditions in the third reaction zone are the same as those for the first reaction zone.

The time required in the third reaction zone for adequate mixing of the solid calcium hypochlorite and unreacted calcium hydroxide from the first reaction zone with the aqueous phase from the second reaction zone is in the range from about 1 to about 30 minutes and preferably from about 3 to about 20 minutes.

Reaction time in the third reaction zone is in the range of about 20 to about 120 minutes, preferably in the range from about 40 to about 100 minutes.

Reacting chlorine with the admixed contents of the third reaction zone under the conditions described above causes the formation of a slurry of solid calcium hypochlorite and sodium chloride, suspended in a liquid. The liquid is comprised of water, sodium chloride, and calcium hypochlorite with minor amounts of organic solvent and organic alcohol.

A small amount of water may be added to the third reaction slurry as necessary to maintain a satisfactory slurry viscosity and to keep as much sodium chloride present in solution as possible. The concentration of sodium chloride in the slurry is in the range of about 2 to about 15% by weight while the concentration of calcium hypochlorite is in the range of about 60 to about 80% by weight. The concentration of water in Another example of a suitable organic solvent family is of the form, $$C_2F_xCl_y$$

where y is an integer from 2 to 6 and x+y=6.

Examples of this family include 1,1,1-trichloro-2,2,2-trifluoroethane, 1,1,2-trichloro-1,2,2-trifluoroethane, 1,1-dichloro-1,2,2,2-tetrafluoroethane, hexachloroethane, and fluoropentachloroethane.

Another example of a suitable family of organic solvents is of the form, $$C_2H_xCl_y$$

where y is an integer from 1 to 6 and x+y=6.

Examples of this family include 1,2-dichloroethane, 1,1,1-trichloroethane, 1,1,2-trichloroethane, 1,1,1,2-tetrachloroethane, 1,1,2,2-tetrachloroethane, and pentachloroethane.

Another example of a suitable family of organic solvents is of the form $$C_2H_xF_y$$

where y is an integer from 1 to 2 and x+y=6. Examples are 1,2-difluoroethane, 1,1-difluoroethane, and fluoroethane.

Another example of a suitable organic family of solvents is of the form $$C_3H_xCl_y$$

where y is an integer from 1 to about 4 and x+y=8.

Eamples of this family include isopropyl chloride, 1,2-dichloropropane, 1,1,1,2-tetrachloropropane, and 1,1,2,2-tetrachloropropane.

Another example of a suitable organic family of solvents is a tertiary halide of the form $$R_1-\underset{\underset{R_3}{|}}{\overset{\overset{R_2}{|}}{C}}-X$$

where X is selected from a group consisting of fluorine and chlorine and where $R_1$, $R_2$, and $R_3$ are selected from a group consisting of alkyl and aryl groups having from 1 to about 10 carbon atoms each. Solvents include 2-chloro-2-methylpropane, 2-chloro-2-methylbutane, 2-chloro-2-methylpentane, and 3-chloro-3-ethylpentane.

Other examples of suitable organic solvents include 2-chlorotoluene, 3-chlorotoluene, 4-chlorotoluene, and alpha-chlorotoluene.

Yet other solvents which may be used include chlorptoluene, 1,2-dichlorobenzene, 1,3-dichlorobenzene, 1,2,4-trichlorobenzene, and fluorobenzene.

Reaction within the first reaction zone proceeds according to the following equation (1):

$$Ca(OH)_2 + 2ROCl \rightarrow Ca(OCl)_2 + 2ROH \quad (1)$$

where ROCl is any organic hypochlorite previously described and ROH is the precursor organic alcohol corresponding to that organic hypochlorite.

The molar ratio of calcium hydroxide to organic hypochlorite reacted in the first reaction zone is in the range from about 0.1:1 to about 10:1, preferably in the range from about 0.25:1 to about 4:1.

It has been found that even when excess organic hypochlorite over the stoichiometric amount required to react with the calcium hydroxide is employed, conversion of calcium hydroxide reactant may be less than about 75%.

The reaction of the organic hypochlorite and calcium hydroxide in the first reaction zone occurs at a temperature in the range from about 0° C. to about 50° C., preferably in the range from about 20° C. to about 40° C. The temperature at which the reaction in the first reaction zone occurs is not critical but is limited by that temperature at which significant quantities of organic hypochlorite decompose.

For example, significant quantities of tertiary butyl hypochlorite may decompose at temperatures above about 50° C. However, this upper decomposition temperature limit is a function of the organic hypochlorite employed.

The operating pressure of the first reaction zone is essentially atmospheric, but may be subatmospheric or superatmospheric.

The time required for the reaction of the first reaction zone is in the range from about 10 to about 180 minutes, preferably from about 20 to about 120 minutes.

It has been found that if the free water content is present in excess of about 1% by weight of total mixture in the first reaction zone reactants, reaction zone, or products, such amounts of water cause thickening of the products and a filter cake subsequently formed during a filtration step to such an extent that atmospheric filtration is extremely difficult.

In accordance with the process of this invention reactants containing less than about 1% water by weight of total mixture are fed to the first reaction zone, wherein the water content is maintained less than about 1% by weight of the mixture contained therein.

Reacting calcium hydroxide with the liquid organic hypochlorite under the conditions described above causes the formation of the first reaction zone product, which is a slurry of solid calcium hypochlorite and residual calcium hydroxide suspended in the organic liquid. The organic liquid is comprised of organic hypochlorite, organic solvent, and organic alcohol.

The solid calcium hypochlorite and calcium hydroxide are separated from the organic liquid by any suitable solid-liquid separation technique, such as by filtration, centrifuging, settling and the like. Filtration is the preferred form of solid-liquid separation, and the invention will be described using filtration as the solid-liquid separation technique. One skilled in the art will recognize that any other suitable solid separation technique may be employed.

The filtrate obtained during filtration of the first reaction zone product is a depleted organic hypochlorite solution comprised of organic hypochlorite, organic solvent and organic alcohol. The filtrate is recovered and otherwise processed, for example it may be transferred to the depleted organic hypohalite storage area for use as described more fully below.

The filter cake formed during filtration of the first reaction zone product is a mixture of calcium hypochlorite and calcium hydroxide solids containing a minimal amount of residual filtrate.

The residual filtrate is preferably removed from the filter cake by any conventional technique such as by passing the filter cake through an evaporator under the third reaction zone slurry is in the range of about 40% to about 60%, preferably in the range of about 45% to about 55% by weight. However, only the necessary amount of water is added to the third reaction zone so as to minimize dissolving solid calcium hypochlorite.

The calcium hypochlorite product of the third reaction zone is recovered in dry granular form by any conventional drying technique. For example, in a first embodiment of this invention, the slurry of the third reaction zone is sprayed in droplet form onto a moving bed of solid calcium hypochlorite granules in a heated zone, where the water is evaporated and the solid component of the slurry remains in layer form on the previously formed granules. A process of spray graining calcium hypochlorite may be employed as described more fully in U.S. Pat. No. 3,969,546, issued to Walter C. Saeman on July 13, 1976.

In a second embodiment of this invention, third reaction zone slurry (high assay or otherwise) is conventionally filtered thereby forming a filtrate and a filter cake.

The filtrate of the second embodiment is an aqueous solution comprised of sodium chloride, calcium hypochlorite, and minor amounts of organic solvent and organic alcohol. The filtrate is conventionally treated to recover retained chlorine species.

The filter cake formed during filtration is comprised of calcium hypochlorite, sodium chloride, water, and a minor amount of calcium chloride and sodium hypochlorite. This filter cake is dried in suitable shelf dryer or rotary dryer provided with heated gas to effect drying and granulation. Appropriate temperature ranges are employed to reduce the water content to the desired level.

U.S. Pat. No. 3,895,099, issued to Walter J. Sakowski on July 15, 1975, discloses a process for drying a calcium hypochlorite composition similar to the filter cake produced by the process of this embodiment.

In that patent, calcium hypochlorite compositions are dried in a turbodryer with hot air while maintaining the product temperature in the range from about 35° C. to about 110° C., and preferably in the range from about 40° C. to about 95° C.

The depleted organic hypochlorite storage material obtained from various zones of the process of this invention may be recycled and employed in the preparation of organic hypochlorites by the reaction of an organic alcohol with chlorine.

An advantage of the process of the present invention is that a very small amount of various halide compounds are produced in the reactions of the first and second reaction zones and results in a low halide composition in the reaction zones. As a result, there is a reduction in the process requirements needed to achieve a low halide calcium hypochlorite product in the process of this invention.

The following examples are presented to define the invention more fully without any intentions of being limited thereby. All parts and percentages are by weight unless indicated otherwise.

EXAMPLE 1

Calcium hydroxide was reacted with tertiary butyl hypochlorite in a reactor provided with agitation means to produce calcium hypochlorite and tertiary butyl alcohol. About 6.52 parts of commercial grade calcium hydroxide containing about 95% calcium hydroxide, along with about 67 parts of a solution containing about 2.28 parts tertiary butyl hypochlorite in carbon tetrachloride solution were added slowly into the reactor.

The resulting slurry was agitated for about two hours at atmospheric pressure at a temperature in the range from about 25° C. to about 35° C., and then filtered. The filter cake was then washed with about 150 parts carbon tetrachloride to remove any remaining tertiary butyl hypochlorite from the filter cake.

The carbon tetrachloride wash was collected in the same container as the filtrate previously collected. The filter cake was dried at room temperature for about 20 minutes to evaporate most of the remaining carbon tetrachloride in the filter cake.

Based upon a recovery of about 0.65 parts tertiary butyl hypochlorite in the filtrate, the conversion of tertiary butyl hypochlorite was about 71.7%. Based on about 0.99 parts calcium hypochlorite recovered in the filter cake, the calcium hypochlorite yield was about 92%.

EXAMPLE 2

In Example II, conditions were the same as in Example I, except 15.4 parts of commercial grade calcium hydroxide having about 96% calcium hydroxide content and about 134 parts of a carbon tetrachloride solution containing about 10.8 parts tertiary butyl hypochlorite were used. Based on about 0.3 parts of tertiary butyl hypochlorite recovered in the filtrate, the tertiary butyl hypochlorite conversion was about 97.2%. Based on about 7.3 parts of calcium hypochlorite recovered in the filter cake, the yield for calcium hypochlorite was about 100%.

On a dry basis, the filter cake analyzed about 49.9% calcium hypochlorite and about 51.1% calcium hydroxide.

EXAMPLE 3

About 200 parts of a solution of tertiary butyl hypochlorite in carbon tetrachloride (containing about 13.7 parts tertiary butyl hypochlorite) was added to a reactor provided with agitation means along with about 35.5 parts of about a 14.6% aqueous sodium hydroxide solution. The resulting slurry was agitated for about 15 minutes at atmospheric pressure at a temperature in the range from about 25° C. to about 35° C. The product mixture was removed from the reactor and phase separated into organic and aqueous phases which required about 10 minutes. About 8.4 parts of sodium hypochlorite were recovered in the aqueous phase and about 0.2 parts of tertiary butyl hypochlorite were recovered in the organic phase. The conversion of tertiary butyl hypochlorite was about 98.5% and yield of sodium hypochlorite was about 92.3%. The aqueous phase analyzed about 19.8% NaOCl, 0.06% NaOH, 0.41% NaCl, with the remainder being essentially water.

EXAMPLE 4

Step A

Calcium hydroxide was reacted with tertiary butyl hypochlorite in a reactor provided with agitation means to produce calcium hypochlorite and tertiary butyl alcohol. About 100 parts of commercial grade lime containing about 98.2 parts calcium hydroxide, along with about 337.2 parts of a solution of tertiary butyl hypochlorite in 1,1,2-trichloro-1,2,2-trifluoroethane containing about 120.7 parts tertiary butyl hypochlorite were added slowly into the reactor.

The resulting slurry was agitated for about 1½ hours at atmospheric pressure at about 25° C., while about 600 parts of 1,1,2-trichloro-1,2,2-trifluoroethane was added to the slurry. The slurry was filtered, and the filter cake washed with about 60 parts 1,1,2-trichloro-1,2,2-trifluoroethane to remove any tertiary butyl hypochlorite from the filter cake. The filter cake was then dried in the filter for about 2½ hours at about 25° C. to evaporate most of the remaining 1,1,2-trichloro-1,2,2-trifluoroethane from the filter cake.

Based on a recovery of about 15.8 parts tertiary butyl hypochlorite in the filtrate, the conversion of tertiary butyl hypochlorite was about 93.5%. Based on about 66.8 parts calcium hypochlorite recovered in the filter cake and about 2.7 parts calcium hypochlorite remaining on the reactor and filter walls the calcium hypochlorite yield was about 93.6%.

Step B

About 282 parts of a solution of tertiary butyl hypochlorite in carbon tetrachloride (containing about 39.9 parts tertiary butyl hypochlorite) was added to a reactor provided with agitation means along with about 154 parts of about a 10.2% aqueous sodium hydroxide solution. The resulting slurry was agitated for about 15 minutes at atmospheric pressure at a temperature in the range from about 25° C. to about 35° C. The product mixture was removed from the reactor and phase separated into organic and aqueous phases which required about 10 minutes. About 28.5 parts of sodium hypochlorite were recovered in the aqueous phase and about 4.1 parts of tertiary butyl hypochlorite were recovered in the organic phase. The conversion of tertiary butyl hypochlorite was about 90.0% and the yield of sodium hypochlorite was about 100.0%. The aqueous chlorinated caustic phase analyzed about 16.4% NaOCl, 0.1% NaCl, with the remainder being essentially water.

Step C

About 45.5 parts of the dry filter cake of Step A having a composition of 49.3% Ca(OCl)$_2$, 41.2% Ca(OH)$_2$ and 3.9% CaCl$_2$, with the remainder being inert components and organic solvent was mixed with 140.0 parts of the aqueous chlorinated caustic phase of Step B and transferred to a chlorinating vessel equipped with an agitation means. The mixture was chlorinated with gaseous chlorine at about 28° C. for about ½, until excess alkalinity was about 1%. About 200 parts creamy-white paste was recovered which analyzed about 77.4% Ca(OCl)$_2$, 1.4% Ca(OH)$_2$, 20.2% NaCl, 0.6% NaCl, 0.4% NaClO$_3$, all dry bases.

What is claimed is:

1. A process for producing calcium hypochlorite which comprises:
   (a) reacting organic hypochlorite with calcium hydroxide in a first reaction zone to form calcium hypochlorite, wherein said calcium hydroxide has a free water content of less than about 1% by weight and wherein said first reaction zone has a free water content of less than about 1% by weight,
   (b) separating calcium hypochlorite and unreacted calcium hydroxide from the first reaction zone as a mixture of solids,
   (c) reacting organic hypochlorite with sodium hydroxide in a second reaction zone to form an aqueous phase containing sodium hypochlorite and an organic phase,
   (d) separating said aqueous phase from said organic phase,
   (e) reacting chlorine with said mixture of solids and said aqueous phase in a third reaction zone to produce an aqueous slurry of calcium hypochlorite particles, and
   (f) recovering said calcium hypochlorite particles from said slurry.

2. The process of claim 1, wherein said mixture of solids and said aqueous phase are admixed prior to reacting with said chlorine.

3. The process of claim 2, wherein the molar ratio of said calcium hydroxide to said organic hypochlorite in said first reaction zone is in the range from about 0.1:1 to about 10:1.

4. The process of claim 3, wherein the molar ratio of said sodium hydroxide to said organic hypochlorite in said second reaction zone is in the range from about 1:1 to about 3:1.

5. The process of claim 4, wherein the molar ratio of said calcium hydroxide to said sodium hypochlorite in said third reaction zone is in the range from about 0.7:1 to about 1.2:1.

6. The process of claim 5, wherein the molar ratio of said calcium hydroxide to said organic hypochlorite in said first reaction zone is in the range from about 0.25:1 to about 4:1, wherein the molar ratio of said sodium hydroxide to said organic hypochlorite in said second reaction zone is in the range from about 1.02:1 to about 1.5:1 and wherein the molar ratio of said calcium hydroxide to said sodium hypochlorite in said third reaction zone is in the range from about 0.8:1 to about 1.1:1.

7. The process of claim 6, wherein the temperature of said first, second, and third reaction zones is in the range from about 0° C. to about 50° C.

8. The process of claim 7, wherein the temperature of said first, second, and third reaction zones is in the range from about 20° C. to about 40° C.

9. The process of claim 8, wherein said organic hypochlorite is a tertiary hypochlorite of the form,

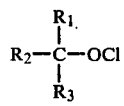

wherein R$_1$, R$_2$, and R$_3$ are each selected from a group consisting of alkyl and aryl groups having 1 to about 10 carbon atoms each.

10. The process of claim 8, wherein said organic hypochlorite is a secondary hypochlorite of the form,

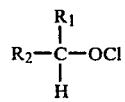

where R$_1$ and R$_2$ are each selected from a group consisting of alkyl and aryl groups having 1 to about 10 carbon atoms each.

11. The process of claim 8, wherein said organic hypochlorite is a tertiary diol hypochlorite of the form,

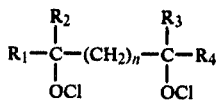

where n is an integer from 1 to about 10 and $R_1$, $R_2$, $R_3$, and $R_4$ are each separate alkyl and aryl groups having 1 to about 10 carbon atoms each.

12. The process of claim 8, wherein said organic hypochlorite is cyclohexane hypochlorite.

13. The process of claim 9, wherein said tertiary hypochlorite is tertiary amyl hypochlorite.

14. The process of claim 9, wherein said tertiary hypochlorite is 3-methylpentane-3-hypochlorite.

15. The process of claim 9, wherein said tertiary hypochlorite is tertiary butyl hypochlorite.

16. The process of claim 15, wherein a precursor organic alcohol corresponding to said organic hypochlorite is present during the reaction with said calcium hydroxide in said first reaction zone.

17. The process of claim 16, wherein an essentially immiscible essentially inert organic solvent is present during the reaction between said organic hypochlorite with said calcium hydroxide in said first reaction zone.

18. The process of claim 17, wherein said organic solvent is of the form,

where $x+y=4$ and y is an integer from 2 to 4.

19. The process of claim 17, wherein said organic solvent is of the form,

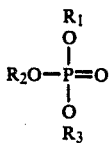

where $R_1$, $R_2$, and $R_3$ are each selected from a group consisting of alkyl and aryl groups having 1 to about 10 carbon atoms each.

20. The process of claim 17, wherein said organic solvent is of the form,

where y is an integer from 2 to 6 and $x+y=6$.

21. The process of claim 17, wherein said organic solvent is of the form,

where y is an integer from 1 to 6 and $x+y=6$.

22. The process of claim 17, wherein said organic solvent is of the form,

where y is an integer from 1 to 2 and $x+y=6$.

23. The process of claim 17, wherein said organic solvent is of the form,

where y is an integer from 1 to about 4 and $x+y=8$.

24. The process of claim 17, wherein said organic solvent is a tertiary halide of the form,

where X is selected from a group consisting of fluorine and chlorine and $R_1$, $R_2$, and $R_3$ are each selected from a group consisting of alkyl and aryl groups having 1 to about 10 carbon atoms each.

25. The process of claim 17, wherein said organic solvent is selected from a group consisting of 2-chlorotoluene, 3-chlorotoluene, 4-chlorotoluene, and alpha-chlorotoluene.

26. The process of claim 17, wherein said organic solvent is selected from a group consisting of chlorobenzene, 1,2-dichlorobenzene, 1,3-dichlorobenzene, 1,2,4-trichlorobenzene, and fluorobenzene.

27. The process of claim 17, wherein said organic solvent is $CCl_4$.

28. The process of claim 27, wherein recovery of said calcium hypochlorite particles from said slurry is effected by spray graining said slurry in a heated atmosphere to form dry granules of calcium hypochlorite.

29. The process of claim 27, wherein recovery of said calcium hypochlorite particles from said slurry is effected by filtering said slurry to recover a calcium hypochlorite filter cake and drying said filter cake with agitation to form dry granules of calcium hypochlorite.

* * * * *

UNITED STATES PATENT AND TRADEMARK OFFICE
CERTIFICATE OF CORRECTION

PATENT NO. : 4,183,907

DATED : January 15, 1980

INVENTOR(S) : Richard W. Lynch and Ronald L. Dotson

It is certified that error appears in the above-identified patent and that said Letters Patent are hereby corrected as shown below:

Column 11, line 48, after "½" insert --hour--.

Column 11, line 52, "bases" should read --basis--.

*Signed and Sealed this*

*Twenty-ninth* Day of *April 1980*

[SEAL]

*Attest:*

SIDNEY A. DIAMOND

*Attesting Officer* — *Commissioner of Patents and Trademarks*